US012678773B2

(12) United States Patent
Witte

(10) Patent No.: US 12,678,773 B2
(45) Date of Patent: Jul. 14, 2026

(54) SUPPORTED TRANSITION METAL NANOPARTICLE CATALYST AND USE THEREOF AS A HYDROGENATION CATALYST

(71) Applicant: BASF CORPORATION, Florham Park, NJ (US)

(72) Inventor: Peter Witte, De Meern (NL)

(73) Assignee: BASF CORPORATION, Florham Park, NJ (US)

( * ) Notice: Subject to any disclaimer, the term of this patent is extended or adjusted under 35 U.S.C. 154(b) by 702 days.

(21) Appl. No.: 17/923,005

(22) PCT Filed: May 4, 2021

(86) PCT No.: PCT/EP2021/061711
§ 371 (c)(1),
(2) Date: Nov. 3, 2022

(87) PCT Pub. No.: WO2021/224246
PCT Pub. Date: Nov. 11, 2021

(65) Prior Publication Data
US 2023/0356193 A1 Nov. 9, 2023

(30) Foreign Application Priority Data

May 5, 2020 (EP) ..................................... 20172917

(51) Int. Cl.
| | |
|---|---|
| *B01J 21/04* | (2006.01) |
| *B01J 21/06* | (2006.01) |
| *B01J 21/08* | (2006.01) |
| *B01J 21/10* | (2006.01) |
| *B01J 21/12* | (2006.01) |
| *B01J 21/14* | (2006.01) |
| *B01J 21/18* | (2006.01) |
| *B01J 23/36* | (2006.01) |
| *B01J 23/38* | (2006.01) |
| *B01J 23/42* | (2006.01) |
| *B01J 23/44* | (2006.01) |
| *B01J 23/46* | (2006.01) |
| *B01J 23/48* | (2006.01) |
| *B01J 31/02* | (2006.01) |
| *B01J 35/00* | (2006.01) |
| *B01J 35/23* | (2024.01) |
| *B01J 35/45* | (2024.01) |
| *B01J 35/61* | (2024.01) |
| *B01J 35/80* | (2024.01) |

(Continued)

(52) U.S. Cl.
CPC ........... *B01J 23/44* (2013.01); *B01J 31/0249* (2013.01); *B01J 35/19* (2024.01); *B01J 35/45* (2024.01); *B01J 35/613* (2024.01); *B01J 35/615* (2024.01); *B01J 35/617* (2024.01); *B01J 35/80* (2024.01); *B01J 37/0018*

(2013.01); *B01J 37/0203* (2013.01); *B01J 37/0211* (2013.01); *B01J 37/0213* (2013.01); *B01J 37/04* (2013.01); *B01J 37/08* (2013.01); *B01J 35/23* (2024.01); *B01J 2235/00* (2024.01); *B01J 2235/15* (2024.01); *B01J 2235/30* (2024.01)

(58) Field of Classification Search
CPC . B01J 21/04; B01J 21/06; B01J 21/063; B01J 21/066; B01J 21/08; B01J 21/10; B01J 21/12; B01J 21/14; B01J 21/18; B01J 23/36; B01J 23/42; B01J 23/44; B01J 23/46; B01J 23/48; B01J 35/19; B01J 35/613; B01J 35/615; B01J 35/17; B01J 31/0249; B01J 35/45; B01J 35/617; B01J 35/80; B01J 37/0018; B01J 37/0203; B01J 37/0211; B01J 37/0213; B01J 37/04; B01J 37/08; B01J 35/23; B01J 2235/00; B01J 2235/15; B01J 2235/30; B01J 35/635; B01J 37/0201; B01J 37/0238; B01J 23/38; B01J 37/0081; B01J 35/30; B01J 35/56
USPC ........ 502/182–185, 258–262, 332–334, 339, 502/345–346, 349–351, 355, 415, 439
See application file for complete search history.

(56) References Cited

U.S. PATENT DOCUMENTS

| | | | | |
|---|---|---|---|---|
| 6,262,129 B1 * | 7/2001 | Murray | ................. | B82Y 30/00 |
| | | | | 252/62.55 |
| 7,803,498 B2 * | 9/2010 | Dressick | ............. | H01M 4/8657 |
| | | | | 502/185 |

(Continued)

FOREIGN PATENT DOCUMENTS

| | | |
|---|---|---|
| CN | 102219189 A | 10/2011 |
| EP | 2082805 A1 | 7/2009 |

(Continued)

OTHER PUBLICATIONS

International Search Report for PCT/EP2021/0061711 mailed Jun. 17, 2021, 3 pages.

(Continued)

*Primary Examiner* — Cam N. Nguyen
(74) *Attorney, Agent, or Firm* — Peter DiMauro

(57) ABSTRACT
A catalyst comprising transition metal nanoparticles, stabilizing ligands, and a support material, wherein at least a portion of the stabilizing ligands are adsorbed on the surface of the transition metal nanoparticles such as to form stabilized transition metal nanoparticles, wherein the stabilized transition metal nanoparticles are supported on the support material, wherein the catalyst displays a molar ratio of the stabilizing ligands to the transition metal in the nanoparticles calculated as the element, wherein the molar ratio is comprised in the range of from 0.1 to 25.

12 Claims, No Drawings

(51) Int. Cl.

| | |
|---|---|
| *B01J 37/00* | (2006.01) |
| *B01J 37/02* | (2006.01) |
| *B01J 37/04* | (2006.01) |
| *B01J 37/08* | (2006.01) |

(56) References Cited

U.S. PATENT DOCUMENTS

| | | | | |
|---|---|---|---|---|
| 9,502,716 | B2 * | 11/2016 | Co | H01M 4/926 |
| 9,801,962 | B2 * | 10/2017 | Sun | B01J 13/02 |
| 10,232,354 | B2 * | 3/2019 | Witte | B01J 21/08 |
| 10,258,967 | B2 * | 4/2019 | Witte | B01J 35/40 |
| 2008/0193368 | A1 | 8/2008 | Zhihua et al. | |
| 2011/0257006 | A1 * | 10/2011 | Thieuleux | B82Y 30/00 |
| | | | | 502/262 |
| 2012/0020872 | A1 | 1/2012 | Sukesh et al. | |
| 2014/0370421 | A1 * | 12/2014 | Strmcnik | H01M 8/083 |
| | | | | 429/525 |

FOREIGN PATENT DOCUMENTS

| | | | |
|---|---|---|---|
| EP | 2719455 | A1 | 4/2014 |
| WO | 2009/096783 | A1 | 8/2009 |
| WO | 2013/160163 | A1 | 10/2013 |
| WO | 2016/151453 | A1 | 9/2016 |
| WO | 2016/151454 | A1 | 9/2016 |

OTHER PUBLICATIONS

Alabani et al., "Ligand ordering determines the catalytic response of hybrid palladium nanoparticles in hydrogenation," Catal. Sci. Technol., 2016, 6, 1621-1631.

Witte et al., "Highly active and selective precious metal catalysts by use of the reduction-deposition method," 10th International Symposium "Scientific Bases for the Preparation of Heterogeneous Catalysts", E. M. Gaigneaux, M. Devillers, S. Hermans, P. Jacobs, J. Martens, and P. Ruiz (Editors), Elsevier 2010, 135-143.

Giacomo M. Lari et al., Hybrid Palladium Nanoparticles for Direct Hydrogen Peroxide Synthesis: The Key Role of the Ligand, Angew. Chem., 2017, vol. 129, pp. 1801-1805.

* cited by examiner

SUPPORTED TRANSITION METAL NANOPARTICLE CATALYST AND USE THEREOF AS A HYDROGENATION CATALYST

CROSS REFERENCE TO RELATED APPLICATION(S)

The present application is a national stage entry under 35 U.S.C. § 371 of International Application No. PCT/EP2021/061711, filed on May 4, 2021, which claims priority to European Patent Application No. 20172917.5, filed on May 5, 2020, the entirety of which are incorporated herein by reference in their entirety.

TECHNICAL FIELD

The present invention relates to a catalyst comprising transition metal nanoparticles, stabilizing ligands, and a support material, wherein the catalyst displays a specific molar ratio of the stabilizing ligands to the transition metal in the nanoparticles. Further, the present invention relates to a further for preparation of such a catalyst and a use thereof.

INTRODUCTION

Catalysts based on colloidal suspensions attracted much attention in the past decade, both as supported and as quasi-homogeneous catalysts. These catalysts are prepared by the so-called reduction-deposition method, where a metal is first reduced in solution in the presence of a stabiliser before it is deposited on a heterogeneous support. By using the appropriate reaction conditions, metal crystallites of <10 nm are available. These catalysts are called nanocatalysts, although the metal crystallite size is not much different from commercial catalysts prepared by traditional methods. However, the metal crystallite size distribution of the nanocatalysts is narrower and they do not contain large metal crystallites that are sometimes observed in traditional catalysts. Large metal crystallites will only contribute marginally to the catalyst activity, while they contain a significant fraction of the total amount of metal. The catalyst activity can thus be boosted by preparing catalysts that do not contain these larger metal crystallites. For industrial applications the use of nanocatalysts prepared by reduction-deposition is hampered by their cumbersome preparation. In general low metal concentrations are employed, but also the use of low-boiling organic solvents, high temperatures, very fast addition of reagents, or the use of reagents that are expensive or not commercially available makes their production on an industrial scale difficult.

WO 2009/096783 A1 concerns a process for the preparation of aqueous suspensions of precious metal colloids. Witte et al., "Highly active and selective precious metal catalysts by use of the reduction-deposition method", 10th International Symposium "Scientific Bases for the Preparation of Heterogeneous Catalysts", E. M. Gaigneaux, M. Devillers, S. Hermans, P. Jacobs, J. Martens, and P. Ruiz (Eds.), Elsevier 2010 relates to the production of colloids of Pd and Pt and to their loading of support materials, as well as to their use in the hydrogenation of 3-hexyn-1-ol. Albani et al. in Catal. Sci. Technol. 2016, 6, 1621-1631, concerns the production of palladium nanocatalysts with varying ligand content.

WO 2013/160163 A1, on the other hand, relates to hydrogenation catalysts and to their use in the production of hydrogen peroxide.

Finally, WO 2016/151453 A1 and WO 2016/151454 A1 respectively describe supported transition metal catalysts including hydrogenation catalysts, as well as methods for their production involving the synthesis of transition metal colloids and supporting them on various support materials.

US 2008/193368 A1 discloses methods for manufacturing a catalyst for the direct synthesis of hydrogen peroxide. The nanocatalyst particles are manufactures from catalyst atoms complexed with organic agent molecules. Similarly US 2012/020872 A1 discloses a method for making a direct synthesis hydrogen peroxide catalyst wherein polyacrylic acid is used as an organic dispersing agent to stabilize nanoparticles of Pt/Pd supported on silica. EP 2719455 A1 discloses a phosphine-ligated ruthenium compound supported on a porous solid support for hydrogenation reaction of aromatic compounds.

Despite the progress made in the development of nanocatalyst technology, there yet remains a need for the provision of new and improved catalysts, in particular with regard to the catalyst activity and selectivity, as well as with respect to the cost-efficiency and catalyst lifetime.

DETAILED DESCRIPTION

It was therefore an object of the present invention to provide an improved catalyst which contains nanoparticles, in particular with regard to the cost and efficiency of the catalyst. Furthermore, it was an object of the present invention to provide a highly selective catalyst with regard to the desired reaction, which furthermore displays an improved activity. Thus, it has surprisingly been found that the inventive catalyst allows not only for an increase in the activity at lower metal loadings, but also provides a remarkably low selectivity to highly undesirable side reactions. Furthermore, it has surprisingly been found that the inventive process not only allows for a far better control over the loading amounts of nanoparticles which is desired in the catalyst, and in particular for particularly high and low loadings, but furthermore allows for the facile loading onto a variety of different types supports without involving any burdensome work-up for obtaining the final catalyst.

Therefore, the present invention relates to a catalyst comprising transition metal nanoparticles, stabilizing ligands, and a support material, wherein at least a portion of the stabilizing ligands are adsorbed on the surface of the transition metal nanoparticles such as to form stabilized transition metal nanoparticles, wherein the stabilized transition metal nanoparticles are supported on the support material, wherein the catalyst displays a molar ratio of the stabilizing ligands to the transition metal in the nanoparticles calculated as the element, wherein the molar ratio is comprised in the range of from 0.1 to 25, preferably of from 0.5 to 15, more preferably of from 1 to 10, more preferably of from 2 to 5, more preferably of from 3 to 4.5, more preferably of from 3.3 to 4, and more preferably of from 3.5 to 3.7.

It is preferred that the number-based average particle size D50 of the transition metal nanoparticles is in the range of from 0.2 to 20 nm, more preferably from 0.4 to 10 nm, more preferably from 0.6 to 5 nm, more preferably from 0.8 to 4 nm, more preferably from 1 to 3.5 nm, more preferably from 1.2 to 3 nm, more preferably from 1.4 to 2.7 nm, more preferably from 1.6 to 2.5 nm, more preferably from 1.8 to 2.3 nm, and more preferably from 1.9 to 2.1 nm.

It is preferred that the transition metal of the nanoparticles is selected from the group consisting of Cu, Ru, Rh, Pd, Ag, Re, Os, Ir, Pt, Au, and alloys of two or more thereof, more preferably from the group consisting of Pd, Pt, Ru, Rh, Au, Ag, and alloys of two or more thereof, and more preferably from the group consisting of Pd, Pt, Au, Ag, and alloys of two or more thereof, wherein more preferably the transition metal of the nanoparticles comprises Pd, Pt, PdAu, PdAg, PtAu, or PtAg, preferably Pd, PdAg, or PdAu, more preferably Pd or PdAu, and more preferably Pd, wherein more preferably the transition metal of the nanoparticles is Pd, Pt, PdAu, PdAg, PtAu, or PtAg, preferably Pd, PdAg, or PdAu, more preferably Pd or PdAu, and more preferably Pd.

It is preferred that the stabilizing ligands comprise one or more surfactants, wherein the one or more surfactants are preferably selected from the group consisting of ionic and nonionic surfactants, including mixtures thereof, preferably from the group consisting of ionic surfactants.

In the case where the stabilizing ligands comprise one or more ionic surfactants, it is preferred that the one or more ionic surfactants comprise one or more cationic surfactants, more preferably one or more cationic surfactants selected from the group consisting of tetraalkylammonium compounds, including mixtures of two or more thereof, wherein more preferably the cationic surfactants comprise one or more hydroxyl group containing tetraalkylammonium compounds, preferably one or more tetraalkylammonium compounds containing $R^1R^2R^3N^+R^4OH$, wherein $R^1$ stands for C10-C20 alkyl, preferably for C12-C19 alkyl, more preferably for C14-C18 alkyl, more preferably for C15-C17 alkyl, and more preferably for C16 alkyl, wherein independently from one another, $R^2$ and $R^3$ stands for C1-C5 alkyl, preferably for C1-C4 alkyl, more preferably for C1-C3 alkyl, more preferably for C1-C2 alkyl, and more preferably for C1 alkyl, and $R^4$ stands for C1-C6 alkylene, preferably for C1-C5 alkylene, more preferably for C2-C4 alkylene, more preferably for C2-C3 alkylene, and more preferably for C2 alkylene, wherein more preferably the one or more cationic surfactants comprise a hexadecyl(2-hydroxyethyl)dimethyl ammonium containing compound, wherein the counterion is preferably selected from the group consisting of halides, carbonates, hydroxide, nitrate, phosphate, hydrogen phosphate, dihydrogen phosphate, sulfate, hydrogen sulfate, and combinations of two or more thereof, more preferably from the group consisting of chloride, fluoride, bromide, hydrogen carbonate, hydroxide, nitrate, hydrogen phosphate, dihydrogen phosphate, hydrogen sulfate, and combinations of two or more thereof, more preferably from the group consisting of hydroxide, nitrate, dihydrogen phosphate, hydrogen sulfate, and combinations of two or more thereof, wherein more preferably the counterion is dihydrogen phosphate, wherein more preferably the one or more ionic surfactants comprise hexadecyl(2-hydroxyethyl)dimethyl ammonium dihydrogen phosphate, wherein more preferably the ionic surfactant is hexadecyl(2-hydroxyethyl)dimethyl ammonium dihydrogen phosphate.

Further in the case where the stabilizing ligands comprise one or more ionic surfactants, it is preferred that the one or more ionic surfactants comprise one or more cationic surfactants, more preferably one or more cationic surfactants selected from the group consisting of primary, secondary, tertiary, and quaternary ammonium compounds, including mixtures of two or more thereof, wherein more preferably the cationic surfactants comprise one or more quaternary ammonium compounds, preferably selected from the group consisting of salts of $(C_8\text{-}C_{18})$trimethylammonium, $(C_8\text{-}C_{18})$ pyridinium, benzalkonium, benzethonium, dimethyldioctadecylammonium, cetrimonium, dioctadecyldimethylammonium, and mixtures of two or more thereof, more preferably from the group consisting of salts of cetyltrimethylammonium, dodecyltrimethylammonium, cetylpyridinium, benzalkonium, benzethonium, dimethyldioctadecylammonium, cetrimonium, dioctadecyldimethylammonium, wherein the counterion is preferably selected from the group consisting of halides, carbonates, hydroxide, nitrate, phosphate, sulfate, and combinations of two or more thereof, more preferably from the group consisting of chloride, fluoride, bromide, hydrogen carbonate, hydroxide, nitrate, sulfate, and combinations of two or more thereof, wherein more preferably the counterion is chloride and/or nitrate, preferably chloride.

Further in the case where the stabilizing ligands comprise one or more ionic surfactants, it is preferred that the one or more ionic surfactants comprise one or more anionic surfactants, more preferably one or more anionic surfactants selected from the group consisting of salts of $(C_6\text{-}C_{18})$ sulfate, $(C_6\text{-}C_{18})$ethersulfate, $(C_6\text{-}C_{18})$sulfonate, $(C_6\text{-}C_{18})$ sulfosuccinate $(C_6\text{-}C_{18})$phosphate, $(C_6\text{-}C_{18})$carboxylate, and mixtures of two or more thereof, more preferably from the group consisting of salts of $(C_8\text{-}C_{16})$sulfate, $(C_8\text{-}C_{16})$ethersulfate, $(C_8\text{-}C_{16})$sulfonate, $(C_8\text{-}C_{16})$sulfosuccinate, $(C_8\text{-}C_{16})$ phosphate, $(C_8\text{-}C_{16})$carboxylate, and mixtures of two or more thereof, more preferably from the group consisting of salts of $(C_{10}\text{-}C_{14})$sulfate, $(C_{10}\text{-}C_{14})$ethersulfate, $(C_{10}\text{-}C_{14})$ sulfonate, $(C_8\text{-}C_{14})$sulfosuccinate, $(C_{10}\text{-}C_{14})$phosphate, $(C_{10}\text{-}C_{14})$carboxylate, and mixtures of two or more thereof, more preferably from the group consisting of salts of laurylsulfate, laurylsulfonate, dioctyl sulfosuccinate, laurylphosphate, laurate, and mixtures of two or more thereof, wherein the counterion is preferably selected from the group consisting of $H^+$, alkali metals, alkaline earth metals, ammonium, and combinations of two or more thereof, more preferably from the group consisting of $H^+$, $Li^+$, $Na^+$, $K^+$, ammonium, and combinations of two or more thereof, more preferably from the group consisting of $Na^+$, $K^+$, ammonium, and combinations of two or more thereof, wherein even more preferably the counterion is Nat and/or ammonium, preferably Nat.

Further in the case where the stabilizing ligands comprise one or more ionic surfactants, it is preferred that the one or more ionic surfactants comprise one or more zwitterionic surfactants, more preferably one or more betaines, wherein more preferably the one or more ionic surfactants comprise cocamidopropylbetaine or alkyldimethylaminoxide.

Further in the case where the stabilizing ligands comprise one or more ionic surfactants, it is preferred that the one or more nonionic surfactants are selected from the group consisting of $(C_8\text{-}C_{22})$alcohols, $(C_6\text{-}C_{20})$alcohol ethoxylates with 1 to 8 ethylene oxide units, $(C_6\text{-}C_{20})$alkyl polyglycosides, polyoxyethylene glycol alkyl ethers, polyoxypropylene glycol alkyl ethers, glucoside alkyl ethers, polyoxyethylene glycol alkylphenol ethers, glycerol alkyl esters, sorbitan alkyl esters, polyoxyethylene glycol sorbitan alkyl esters, cocamide monoethanolamine, cocamide diethanolamine, dodecyldimethylamine oxide, block copolymers of polyethylene glycol and polypropylene glycol, polyethoxylated tallow amine, and mixtures of two or more thereof, wherein more preferably the one or more nonionic surfactants are selected from the group consisting of $(C_{14}\text{-}C_{20})$alcohols, $(C_8\text{-}C_{18})$alcohol ethoxylates with 2 to 6 ethylene oxide units, $(C_8\text{-}C_{18})$alkyl polyglycosides, octaethylene glycol monododecyl ether and/or pentaethylene glycol monododecyl ether, polyoxypropylene glycol alkyl ethers, decyl glucoside, lauryl glucoside, myristil glucoside, octyl glucoside, polyoxyethylene glycol octylphenol ethers, preferably triton X100, nonoxynol-9, glyceryl laurate, polyglycerol polyricinoleate, sorbitan monolaurate, sorbitan monopalmitate, sorbitan monostearate, sorbitan monooleate, polyoxyethylene sorbitan monolaurate, polyoxyethylene sorbitan monopalmitate, polyoxyethylene sorbitan monostearate, polyoxyethylene sorbitan monooleate, polyoxyethylene (10) oleyl ether, polyoxyethylene (20) oleyl ether, cocamide monoethanolamine, cocamide diethanolamine, dodecyldimethylamine oxide, block copolymers of polyethylene glycol and polypropylene glycol, polyethoxylated tallow amine, and mixtures of two or more thereof, wherein more preferably the one or more nonionic surfactants are selected from the group consisting of $(C_{16}$-$C_{18})$alcohols, $(C_{16}$-$C_{18})$alcohol ethoxylates with 2 to 6 ethylene oxide units, $(C_8$-$C_{14})$alkyl polyglycosides, preferably cetyl alcohol, stearyl alcohol, oleyl alcohol, and mixtures of two or more thereof, octaethylene glycol monododecyl ether and/or pentaethylene glycol monododecyl ether, polyoxypropylene glycol alkyl ethers, decyl glucoside, lauryl glucoside, myristil glucoside, octyl glucoside, polyoxyethylene glycol octylphenol ethers, nonoxynol-9, glyceryl laurate, polyglycerol polyricinoleate, sorbitan monolaurate, sorbitan monopalmitate, sorbitan monostearate, sorbitan oleate, polyoxyethylene (20) sorbitan monolaurate, polyoxyethylene (20) sorbitan monopalmitate, polyoxyethylene (20) sorbitan monostearate, polyoxyethylene (20) sorbitan monooleate, polyoxyethylene (10) oleyl ether, polyoxyethylene (20) oleyl ether, cocamide monoethanolamine, cocamide diethanolamine, dodecyldimethylamine oxide, block copolymers of polyethylene glycol and polypropylene glycol, polyethoxylated tallow amine, Stearyl-$EO_2$, polyglyceryl-2-dipolyhydroxystearate, polyglyceryl-distearate, C13/15-$PEG_3$, C13-$PEG_2$, glyceryl monooleate, C16/18-$PEG_2$, oleyl-$PEG_2$, $PEG_{20}$-sorbitan monooleate, functionalized polyisobutene, C16/18-$PEG_9$, and mixtures of two or more thereof, more preferably from the group consisting of polyglyceryl-2-dipolyhydroxystearate, diglyceryldistearate, triglyceryl-distearate, C13/15-$PEG_3$, C13-$PEG_2$, glyceryl monooleate, sorbitan monooleate, polyglycerol-3-polyricinoleate, C16/18-$PEG_2$, oleyl-$PEG_2$, $PEG_{20}$-sorbitan monooleate, functionalized polyisobutene, C16/18-$PEG_9$, polyoxyethylene (10) oleyl ether, polyoxyethylene (20) oleyl ether, and mixtures of two or more thereof, more preferably from the group consisting of polyglyceryl-2-dipolyhydroxystearate, diglyceryldistearate, triglyceryl-distearate, polyoxyethylene (10) oleyl ether, polyoxyethylene (20) oleyl ether, and mixtures of two or more thereof, wherein it is even more preferred that the one or more nonionic surfactants comprise polyoxyethylene (10) oleyl ether and/or polyoxyethylene (20) oleyl ether.

It is preferred that the stabilizing ligands form a micelle and or a liposome around at least a portion of the respective nanoparticles, more preferably a liposome.

It is preferred that the catalyst comprises from 0.01 to 10 wt.-% of transition metal nanoparticles calculated as the transition metal and based on 100 wt.-% of the support material, more preferably from 0.05 to 6 wt.-%, more preferably from 0.1 to 4 wt.-%, more preferably from 0.3 to 3 wt.-%, more preferably from 0.5 to 2.5 wt.-%, more preferably from 0.6 to 2 wt.-%, more preferably from 0.7 to 1.5 wt.-%, more preferably from 0.8 to 1.3 wt.-%, and more preferably from 0.9 to 1.1 wt.-%.

It is preferred that the support material comprises carbon and/or a metal oxide and/or a metalloid oxide, more preferably activated carbon and/or an oxide selected from the group consisting of oxides of Si, Al, Ti, Zr, Hf, La, Ce, Pr, Nd, and mixtures and/or mixed oxides of two or more thereof, more preferably from the group consisting of oxides of Si, Al, Ti, Zr, and mixtures and/or mixed oxides of two or more thereof, wherein more preferably the support material is selected from the group consisting of activated carbon, silica, alumina, silica-alumina, aluminosilicates, titanosilicates, and mixtures of two or more thereof, wherein more preferably the support material comprises activated carbon and/or aluminosilicate, preferably sodium aluminosilicate, wherein more preferably the support material consists of activated carbon and/or aluminosilicate, preferably of sodium aluminosilicate.

According to a first alternative with respect to the support material, it is preferred that the support material is a particulate material, wherein more preferably the particulate material displays and weight-based average particle size D50 in the range of from 10 to 800 μm, preferably of from 20 to 500 μm, more preferably of from 40 to 350 μm, more preferably of from 60 to 250 μm, more preferably of from 80 to 200 μm, more preferably of from 100 to 180 μm, more preferably of from 120 to 160 μm, and more preferably of from 130 to 150 μm, wherein preferably the particle size distribution is determined according to ISO 13320-1, and the weight-based average particle size D50 is preferably calculated according to ISO 9276-2:2001.

According to a second alternative with respect to the support material, it is preferred that the support material is a monolith substrate and/or is in the form of granules.

It is preferred that the support material has a BET surface area in the range of from 50 to 800 $m^2/g$, more preferably of from 80 to 600 $m^2/g$, more preferably of from 100 to 500 $m^2/g$, more preferably of from 120 to 450 $m^2/g$, more preferably of from 140 to 300 $m^2/g$, more preferably of from 160 to 250 $m^2/g$, and more preferably of from 180 to 220 $m^2/g$, wherein preferably the surface area is determined according to ISO 9277:2010.

Further, the present invention relates to a process for the preparation of a catalyst, preferably of a catalyst according to any one of the embodiments disclosed herein, said process comprising (1) dissolving one or more surfactants and optionally one or more coordinating agents into a solvent system;

(2) dissolving one or more transition metal salts into a solvent system;

(3) mixing the solution obtained in (1) with the solution obtained in (2);

(4) optionally adjusting the pH of the mixture obtained in (3) to a pH in the range of from 2 to 8;

(5) heating the mixture obtained in (3) or (4) to a temperature in the range of from 50 to 100° C. for forming stabilized transition metal nanoparticles;

(6) separating excess surfactant from the mixture obtained in (5);

(7) contacting the mixture obtained in (6) with a support material for supporting the stabilized transition metal nanoparticles on the support material; wherein in the mixture obtained in (6), the molar ratio of the one or more surfactants to the transition metal in the nanoparticles calculated as the element is preferably comprised in the range of from 1 to 7.

It is preferred that in (6) the molar amount of surfactants in the mixture obtained in (5) is reduced by 20 to 80%, more preferably by 25 to 75%, more preferably by 30 to 70%, more preferably by 35 to 65%, more preferably by 40 to 60%, and more preferably by 45 to 55%.

It is preferred that contacting in (7) is achieved by impregnation, more preferably by incipient wetness impregnation and/or by vacuum impregnation, preferably by vacuum impregnation.

It is preferred that in the mixture obtained in (3), the molar ratio of the one or more surfactants to the transition metal calculated as the element is comprised in the range of from 0.1 to 50, more preferably from 0.3 to 30, more preferably from 0.5 to 20, more preferably from 1 to 15, more preferably from 3 to 12, more preferably from 5 to 10, more preferably from 7 to 8.5, and more preferably from 7.5 to 8.

It is preferred that in the mixture obtained in (6), the molar ratio of the one or more surfactants to the transition metal in the nanoparticles calculated as the element is comprised in the range of from 2 to 6, more preferably of from 2.5 to 5, more preferably of from 3 to 4.5, more preferably of from 3.3 to 4, and more preferably of from 3.5 to 3.7.

It is preferred that separation of the excess surfactant in (6) is achieved by centrifugation and/or filtration, more preferably by filtration, more preferably by membrane filtration, more preferably by nanofiltration, and more preferably by dialysis.

It is preferred that in (5) the mixture is heated for a duration in the range of from 0.05 to 24 h, more preferably from 0.1 to 12 h, more preferably from 0.25 to 6 h, more preferably from 0.5 to 4 h, more preferably from 1 to 3 h, and more preferably from 1.5 to 2.5 h.

It is preferred that in (5) the mixture is heated to a temperature in the range of from 70 to 95° C., more preferably of from 75 to 90° C., and more preferably of from 80 to 85° C.

It is preferred that in (4) the pH is adjusted to a pH in the range of from 2.5 to 7.5, more preferably of from 3 to 7, more preferably of from 3.5 to 6.5, more preferably of from 4 to 6, and more preferably of from 4.5 to 5.5.

It is preferred that the transition metal of the one or more transition metal salts in (2) is selected from the group consisting of Cu, Ru, Rh, Pd, Ag, Re, Os, Ir, Pt, Au, and mixtures of two or more thereof, more preferably from the group consisting of Pd, Pt, Ru, Rh, Au, Ag, and mixtures of two or more thereof, more preferably from the group consisting of Pd, Pt, Au, Ag, and mixtures of two or more thereof, wherein more preferably the transition metal of the one or more transition metal salts in (2) comprises Pd or Pd and Au, wherein more preferably the transition metal of the one or more transition metal salts in (2) is Pd or Pd and Au, preferably Pd.

It is preferred that the counterion of the one or more transition metal salts in (2) is selected from the group consisting of halides, hydroxide, nitrate, phosphate, sulfate, and combinations of two or more thereof, more preferably from the group consisting of chloride, bromide, hydroxide, nitrate, sulfate, and combinations of two or more thereof. It is particularly preferred that the counterion is chloride and/or nitrate, more preferably chloride.

In the case where the counterion of the one or more transition metal salts in (2) is selected from the group consisting of halides, hydroxide, nitrate, phosphate, sulfate, and combinations of two or more thereof, more preferably from the group consisting of chloride, bromide, hydroxide, nitrate, sulfate, and combinations of two or more thereof, wherein more preferably the counterion is chloride and/or nitrate, preferably chloride, it is preferred that the one or more transition metal salts in (2) are provided as a halide complex, more preferably as a chloride complex, and more preferably as a tetrachloro complex, wherein the counterion of the complex is preferably selected from the group consisting of $H^+$, alkali metals, alkaline earth metals, ammonium, and combinations of two or more thereof, more preferably from the group consisting of $Na^+$, $K^+$, $H^+$, and combinations of two or more thereof, wherein more preferably the counterion is $Na^+$ and/or $H^+$, preferably $Na^+$.

It is preferred that independently from one another, the solvent system in (1) and (2) comprises one or more polar solvents, more preferably one or more polar protic solvents, more preferably one or more polar protic solvents selected from the group consisting of C1-C4 alcohols, water, and mixtures of two or more thereof, more preferably from the group consisting of n-propanol, isopropanol, methanol, ethanol, water, and mixtures of two or more thereof, more preferably from the group consisting of methanol, ethanol, water, and mixtures of two or more thereof, wherein more preferably the solvent system comprises ethanol and/or water, preferably water, wherein more preferably the solvent system is ethanol and/or water, preferably water.

It is preferred that the one or more surfactants in (1) are selected from the group consisting of ionic and nonionic surfactants, including mixtures thereof, more preferably from the group consisting of ionic surfactants.

In the case where the one or more surfactants in (1) are selected from the group consisting of ionic surfactants, it is preferred that the one or more ionic surfactants comprise one or more cationic surfactants, more preferably one or more cationic surfactants selected from the group consisting of tetraalkylammonium compounds, including mixtures of two or more thereof, wherein more preferably the cationic surfactants comprise one or more hydroxyl group containing tetraalkylammonium compounds, preferably one or more tetraalkylammonium compounds containing $R^1R^2R^3N^+$ $R^4OH$, wherein $R^1$ stands for C10-C20 alkyl, preferably for C12-C19 alkyl, more preferably for C14-C18 alkyl, more preferably for C15-C17 alkyl, and more preferably for C16 alkyl, wherein independently from one another, $R^2$ and $R^3$ stands for C1-C5 alkyl, preferably for C1-C4 alkyl, more preferably for C1-C3 alkyl, more preferably for C1-C2 alkyl, and more preferably for C1 alkyl, and $R^4$ stands for C1-C6 alkylene, preferably for C1-C5 alkylene, more preferably for C2-C4 alkylene, more preferably for C2-C3 alkylene, and more preferably for C2 alkylene, wherein more preferably the one or more cationic surfactants comprise a hexadecyl(2-hydroxyethyl)dimethyl ammonium containing compound, wherein the counterion is preferably selected from the group consisting of halides, carbonates, hydroxide, nitrate, phosphate, hydrogen phosphate, dihydrogen phosphate, sulfate, hydrogen sulfate, and combinations of two or more thereof, more preferably from the group consisting of chloride, fluoride, bromide, hydrogen carbonate, hydroxide, nitrate, hydrogen phosphate, dihydrogen phosphate, hydrogen sulfate, and combinations of two or more thereof, more preferably from the group consisting of hydroxide, nitrate, dihydrogen phosphate, hydrogen sulfate, and combinations of two or more thereof, wherein more preferably the counterion is dihydrogen phosphate, wherein more preferably the one or more ionic surfactants comprise hexadecyl(2-hydroxyethyl)dimethyl ammonium dihydrogen phosphate, wherein more preferably the ionic surfactant is hexadecyl(2-hydroxyethyl)dimethyl ammonium dihydrogen phosphate.

Further in the case where the one or more surfactants in (1) are selected from the group consisting of ionic and nonionic surfactants, it is preferred that the one or more ionic surfactants comprise one or more cationic surfactants, more preferably one or more cationic surfactants selected from the group consisting of primary, secondary, tertiary, and quaternary ammonium compounds, including mixtures of two or more thereof, wherein more preferably the cationic surfactants comprise one or more quaternary ammonium compounds, preferably selected from the group consisting of salts of $(C_8-C_{18})$trimethylammonium, $(C_8-C_{18})$pyridinium, benzalkonium, benzethonium, dimethyldioctadecylammonium, cetrimonium, dioctadecyldimethylammonium, and mixtures of two or more thereof, more preferably from the group consisting of salts of cetyltrimethylammonium, dodecyltrimethylammonium, cetylpyridinium, benzalkonium, benzethonium, dimethyldioctadecylammonium, cetrimonium, dioctadecyldimethylammonium, wherein the counterion is preferably selected from the group consisting of halides, carbonates, hydroxide, nitrate, phosphate, sulfate, and combinations of two or more thereof, more preferably from the group consisting of chloride, fluoride, bromide, hydrogen carbonate, hydroxide, nitrate, sulfate, and combinations of two or more thereof, wherein more preferably the counterion is chloride and/or nitrate, preferably chloride.

Further in the case where the one or more surfactants in (1) are selected from the group consisting of ionic and nonionic surfactants, it is preferred that the one or more ionic surfactants comprise one or more anionic surfactants, more preferably one or more anionic surfactants selected from the group consisting of salts of $(C_6-C_{18})$sulfate, $(C_6-C_{18})$ethersulfate, $(C_6-C_{18})$sulfonate, $(C_6-C_{18})$sulfosuccinate $(C_6-C_{18})$phosphate, $(C_6-C_{18})$carboxylate, and mixtures of two or more thereof, more preferably from the group consisting of salts of $(C_8-C_{16})$sulfate, $(C_8-C_{16})$ethersulfate, $(C_8-C_{16})$sulfonate, $(C_8-C_{16})$sulfosuccinate, $(C_8-C_{16})$phosphate, $(C_8-C_{16})$carboxylate, and mixtures of two or more thereof, more preferably from the group consisting of salts of $(C_{10}-C_{14})$sulfate, $(C_{10}-C_{14})$ethersulfate, $(C_{10}-C_{14})$sulfonate, $(C_8-C_{14})$sulfosuccinate, $(C_{10}-C_{14})$phosphate, $(C_{10}-C_{14})$carboxylate, and mixtures of two or more thereof, more preferably from the group consisting of salts of laurylsulfate, laurylsulfonate, dioctyl sulfosuccinate, laurylphosphate, laurate, and mixtures of two or more thereof, wherein the counterion is preferably selected from the group consisting of $H^+$, alkali metals, alkaline earth metals, ammonium, and combinations of two or more thereof, more preferably from the group consisting of $H^+$, $Li^+$, $Na^+$, $K^+$, ammonium, and combinations of two or more thereof, more preferably from the group consisting of $Na^+$, $K^+$, ammonium, and combinations of two or more thereof, wherein even more preferably the counterion is Nat and/or ammonium, preferably $Na^+$.

Further in the case where the one or more surfactants in (1) are selected from the group consisting of ionic and nonionic surfactants, it is preferred that the one or more ionic surfactants comprise one or more zwitterionic surfactants, more preferably one or more betaines, wherein more preferably the one or more ionic surfactants comprise cocamidopropylbetaine or alkyldimethylaminoxide.

Further in the case where the one or more surfactants in (1) are selected from the group consisting of ionic and nonionic surfactants, it is preferred that the one or more nonionic surfactants are selected from the group consisting of $(C_8-C_{22})$alcohols, $(C_6-C_{20})$alcohol ethoxylates with 1 to 8 ethylene oxide units, $(C_6-C_{20})$alkyl polyglycosides, polyoxyethylene glycol alkyl ethers, polyoxypropylene glycol alkyl ethers, glucoside alkyl ethers, polyoxyethylene glycol alkylphenol ethers, glycerol alkyl esters, sorbitan alkyl esters, polyoxyethylene glycol sorbitan alkyl esters, cocamide monoethanolamine, cocamide diethanolamine, dodecyldimethylamine oxide, block copolymers of polyethylene glycol and polypropylene glycol, polyethoxylated tallow amine, and mixtures of two or more thereof, wherein more preferably the one or more nonionic surfactants are selected from the group consisting of $(C_{14}-C_{20})$alcohols, $(C_8-C_{18})$alcohol ethoxylates with 2 to 6 ethylene oxide units, $(C_8-C_{18})$alkyl polyglycosides, octaethylene glycol monododecyl ether and/or pentaethylene glycol monododecyl ether, polyoxypropylene glycol alkyl ethers, decyl glucoside, lauryl glucoside, myristil glucoside, octyl glucoside, polyoxyethylene glycol octylphenol ethers, preferably triton X100, nonoxynol-9, glyceryl laurate, polyglycerol polyricinoleate, sorbitan monolaurate, sorbitan monopalmitate, sorbitan monostearate, sorbitan monooleate, polyoxyethylene sorbitan monolaurate, polyoxyethylene sorbitan monopalmitate, polyoxyethylene sorbitan monostearate, polyoxyethylene sorbitan monooleate, polyoxyethylene (10) oleyl ether, polyoxyethylene (20) oleyl ether, cocamide monoethanolamine, cocamide diethanolamine, dodecyldimethylamine oxide, block copolymers of polyethylene glycol and polypropylene glycol, polyethoxylated tallow amine, and mixtures of two or more thereof, wherein more preferably the one or more nonionic surfactants are selected from the group consisting of $(C_{16}-C_{18})$alcohols, $(C_{16}-C_{18})$alcohol ethoxylates with 2 to 6 ethylene oxide units, $(C_8-C_{14})$alkyl polyglycosides, preferably cetyl alcohol, stearyl alcohol, oleyl alcohol, and mixtures of two or more thereof, octaethylene glycol monododecyl ether and/or pentaethylene glycol monododecyl ether, polyoxypropylene glycol alkyl ethers, decyl glucoside, lauryl glucoside, myristil glucoside, octyl glucoside, polyoxyethylene glycol octylphenol ethers, nonoxynol-9, glyceryl laurate, polyglycerol polyricinoleate, sorbitan monolaurate, sorbitan monopalmitate, sorbitan monostearate, sorbitan oleate, polyoxyethylene (20) sorbitan monolaurate, polyoxyethylene (20) sorbitan monopalmitate, polyoxyethylene (20) sorbitan monostearate, polyoxyethylene (20) sorbitan monooleate, polyoxyethylene (10) oleyl ether, polyoxyethylene (20) oleyl ether, cocamide monoethanolamine, cocamide diethanolamine, dodecyldimethylamine oxide, block copolymers of polyethylene glycol and polypropylene glycol, polyethoxylated tallow amine, Stearyl-$EO_2$, polyglyceryl-2-dipolyhydroxystearate, polyglyceryl-distearate, C13/15-$PEG_3$, C13-$PEG_2$, glyceryl monooleate, C16/18-$PEG_2$, oleyl-$PEG_2$, $PEG_{20}$-sorbitan monooleate, functionalized polyisobutene, C16/18-$PEG_9$, and mixtures of two or more thereof, more preferably from the group consisting of polyglyceryl-2-dipolyhydroxystearate, diglyceryldistearate, triglyceryl-distearate, C13/15-$PEG_3$, C13-$PEG_2$, glyceryl monooleate, sorbitan monooleate, polyglycerol-3-polyricinoleate, C16/18-$PEG_2$, oleyl-$PEG_2$, $PEG_{20}$-sorbitan monooleate, functionalized polyisobutene, C16/18-PEG$_9$, polyoxyethylene (10) oleyl ether, poly-oxyethylene (20) oleyl ether, and mixtures of two or more thereof,
   more preferably from the group consisting of polyglyc-eryl-2-dipolyhydroxystearate, diglyceryldistearate, tri-glyceryl-distearate, polyoxyethylene (10) oleyl ether, polyoxyethylene (20) oleyl ether, and mixtures of two or more thereof,
   wherein it is even more preferred that the one or more nonionic surfactants comprise polyoxyethylene (10) oleyl ether and/or polyoxyethylene (20) oleyl ether.

It is preferred that the one or more optional coordinating agents in (1) comprise urea and/or ammonia, preferably urea, wherein more preferably the one or more optional coordinating agents consist of urea and/or ammonia, preferably of urea.

It is preferred that in the mixture obtained in (3), the molar ratio of the one or more coordinating agents to the transition metal in the nanoparticles calculated as the element is comprised in the range of from 0.01 to 2, more preferably of from 0.05 to 1, more preferably of from 0.1 to 0.7, more preferably of from 0.15 to 0.5, more preferably of from 0.2 to 0.45, more preferably of from 0.25 to 0.4, and more preferably of from 0.3 to 0.35.

It is preferred that the support material in (7) comprises carbon and/or a metal oxide and/or a metalloid oxide, more preferably activated carbon and/or an oxide selected from the group consisting of oxides of Si, Al, Ti, Zr, Hf, La, Ce, Pr, Nd, and mixtures and/or mixed oxides of two or more thereof, more preferably from the group consisting of oxides of Si, Al, Ti, Zr, and mixtures and/or mixed oxides of two or more thereof, wherein more preferably the support material is selected from the group consisting of activated carbon, silica, alumina, silica-alumina, aluminosilicates, titanosili-cates, and mixtures of two or more thereof, wherein more preferably the support material comprises activated carbon and/or silicalite, preferably silicalite, wherein more preferably the support material consists of activated carbon and/or silicalite, preferably of silicalite.

It is preferred that the support material in (7) is a particulate material, wherein prior to contacting in (7), the particulate material more preferably displays an weight-based average particle size D50 in the range of from 10 to 800 μm, more preferably of from 20 to 500 μm, more preferably of from 40 to 350 μm, more preferably of from 60 to 250 μm, more preferably of from 80 to 200 μm, more preferably of from 100 to 180 μm, more preferably of from 120 to 160 μm, and more preferably of from 130 to 150 μm, wherein preferably the average particle size distribution is determined according to ISO 13320-1, and the weight-based average particle size D50 is calculated according to ISO 9276-2:2001.

It is preferred that the support material in (7) is a monolith substrate and/or is in the form of granules.

It is preferred that prior to contacting in (7), the support material has a BET surface area in the range of from 50 to 800 m$^2$/g, more preferably of from 80 to 600 m$^2$/g, more preferably of from 100 to 500 m$^2$/g, more preferably of from 120 to 450 m$^2$/g, more preferably of from 140 to 300 m$^2$/g, more preferably of from 160 to 250 m$^2$/g, and more preferably of from 180 to 220 m$^2$/g, wherein preferably the surface area is determined according to ISO 9277:2010.

Further, the present invention relates to a catalyst comprising transition metal nanoparticles, stabilizing ligands, and a support material, wherein the stabilizing ligands are adsorbed on the surface of the transition metal nanoparticles such as to form stabilized transition metal nanoparticles, wherein the stabilized transition metal nanoparticles are supported on the support material, wherein the catalyst is obtainable and/or obtained by the process according to any of the embodiments disclosed herein.

Yet further, the present invention relates to a use of a catalyst according to any one of the embodiments disclosed herein as a hydrogenation catalyst, preferably as a hydro-genation catalyst in the production of hydrogen peroxide, and more preferably as a hydrogenation catalyst in the anthraquinone process for the production of hydrogen per-oxide.

The unit bar (abs) refers to an absolute pressure of 105 Pa and the unit Angstrom refers to a length of $10^{-10}$ m.

The present invention is further illustrated by the follow-ing set of embodiments and combinations of embodiments resulting from the dependencies and back-references as indicated. In particular, it is noted that in each instance where a range of embodiments is mentioned, for example in the context of a term such as "any one of embodiments (1) to (4)", every embodiment in this range is meant to be explicitly disclosed for the skilled person, i.e. the wording of this term is to be understood by the skilled person as being synonymous to "any one of embodiments (1), (2), (3), and (4)".

Further, it is explicitly noted that the following set of embodiments is not the set of claims determining the extent of protection, but represents a suitably structured part of the description directed to general and preferred aspects of the present invention.

According to an embodiment (1), the present invention relates to a catalyst comprising transition metal nanopar-ticles, stabilizing ligands, and a support material, wherein at least a portion of the stabilizing ligands are adsorbed on the surface of the transition metal nanoparticles such as to form stabilized transition metal nanoparticles, wherein the stabi-lized transition metal nanoparticles are supported on the support material, wherein the catalyst displays a molar ratio of the stabilizing ligands to the transition metal in the nanoparticles calculated as the element, wherein the molar ratio is comprised in the range of from 0.1 to 25, preferably of from 0.5 to 15, more preferably of from 1 to 10, more preferably of from 2 to 5, more preferably of from 3 to 4.5, more preferably of from 3.3 to 4, and more preferably of from 3.5 to 3.7.

A preferred embodiment (2) concretizing embodiment (1) relates to said catalyst, wherein the number-based average particle size D50 of the transition metal nanoparticles is in the range of from 0.2 to 20 nm, more preferably from 0.4 to 10 nm, more preferably from 0.6 to 5 nm, more preferably from 0.8 to 4 nm, more preferably from 1 to 3.5 nm, more preferably from 1.2 to 3 nm, more preferably from 1.4 to 2.7 nm, more preferably from 1.6 to 2.5 nm, more preferably from 1.8 to 2.3 nm, and more preferably from 1.9 to 2.1 nm.

A further preferred embodiment (3) concretizing embodi-ment (1) or (2) relates to said catalyst, wherein the transition metal of the nanoparticles is selected from the group con-sisting of Cu, Ru, Rh, Pd, Ag, Re, Os, Ir, Pt, Au, and alloys of two or more thereof, more preferably from the group consisting of Pd, Pt, Ru, Rh, Au, Ag, and alloys of two or more thereof, and more preferably from the group consisting of Pd, Pt, Au, Ag, and alloys of two or more thereof, wherein more preferably the transition metal of the nanoparticles comprises Pd, Pt, PdAu, PdAg, PtAu, or PtAg, preferably Pd, PdAg, or PdAu, more preferably Pd or PdAu, and more preferably Pd, wherein more preferably the transition metal of the nanoparticles is Pd, Pt, PdAu, PdAg, PtAu, or PtAg, preferably Pd, PdAg, or PdAu, more preferably Pd or PdAu, and more preferably Pd.

A further preferred embodiment (4) concretizing any one of embodiments (1) to (3) relates to said catalyst, wherein the stabilizing ligands comprise one or more surfactants, wherein the one or more surfactants are preferably selected from the group consisting of ionic and nonionic surfactants, including mixtures thereof, preferably from the group consisting of ionic surfactants.

A further preferred embodiment (5) concretizing embodiment (4) relates to said catalyst, wherein the one or more ionic surfactants comprise one or more cationic surfactants, more preferably one or more cationic surfactants selected from the group consisting of tetraalkylammonium compounds, including mixtures of two or more thereof, wherein more preferably the cationic surfactants comprise one or more hydroxyl group containing tetraalkylammonium compounds, preferably one or more tetraalkylammonium compounds containing $R^1R^2R^3N^+R^4OH$, wherein $R^1$ stands for C10-C20 alkyl, preferably for C12-C19 alkyl, more preferably for C14-C18 alkyl, more preferably for C15-C17 alkyl, and more preferably for C16 alkyl, wherein independently from one another, $R^2$ and $R^3$ stands for C1-C5 alkyl, preferably for C1-C4 alkyl, more preferably for C1-C3 alkyl, more preferably for C1-C2 alkyl, and more preferably for C1 alkyl, and $R^4$ stands for C1-C6 alkylene, preferably for C1-C5 alkylene, more preferably for C2-C4 alkylene, more preferably for C2-C3 alkylene, and more preferably for C2 alkylene, wherein more preferably the one or more cationic surfactants comprise a hexadecyl(2-hydroxyethyl)dimethyl ammonium containing compound, wherein the counterion is preferably selected from the group consisting of halides, carbonates, hydroxide, nitrate, phosphate, hydrogen phosphate, dihydrogen phosphate, sulfate, hydrogen sulfate, and combinations of two or more thereof, more preferably from the group consisting of chloride, fluoride, bromide, hydrogen carbonate, hydroxide, nitrate, hydrogen phosphate, dihydrogen phosphate, hydrogen sulfate, and combinations of two or more thereof, more preferably from the group consisting of hydroxide, nitrate, dihydrogen phosphate, hydrogen sulfate, and combinations of two or more thereof, wherein more preferably the counterion is dihydrogen phosphate, wherein more preferably the one or more ionic surfactants comprise hexadecyl(2-hydroxyethyl)dimethyl ammonium dihydrogen phosphate, wherein more preferably the ionic surfactant is hexadecyl(2-hydroxyethyl)dimethyl ammonium dihydrogen phosphate.

A further preferred embodiment (6) concretizing embodiment (4) or (5) relates to said catalyst, wherein the one or more ionic surfactants comprise one or more cationic surfactants, more preferably one or more cationic surfactants selected from the group consisting of primary, secondary, tertiary, and quaternary ammonium compounds, including mixtures of two or more thereof, wherein more preferably the cationic surfactants comprise one or more quaternary ammonium compounds, preferably selected from the group consisting of salts of ($C_8$-$C_{18}$)trimethylammonium, ($C_8$-$C_{18}$) pyridinium, benzalkonium, benzethonium, dimethyldioctadecylammonium, cetrimonium, dioctadecyldimethylammonium, and mixtures of two or more thereof, more preferably from the group consisting of salts of cetyltrimethylammonium, dodecyltrimethylammonium, cetylpyridinium, benzalkonium, benzethonium, dimethyldioctadecylammonium, cetrimonium, dioctadecyldimethylammonium, wherein the counterion is preferably selected from the group consisting of halides, carbonates, hydroxide, nitrate, phosphate, sulfate, and combinations of two or more thereof, more preferably from the group consisting of chloride, fluoride, bromide, hydrogen carbonate, hydroxide, nitrate, sulfate, and combinations of two or more thereof, wherein more preferably the counterion is chloride and/or nitrate, preferably chloride.

A further preferred embodiment (7) concretizing any one of embodiments (4) to (6) relates to said catalyst, wherein the one or more ionic surfactants comprise one or more anionic surfactants, more preferably one or more anionic surfactants selected from the group consisting of salts of ($C_6$-$C_{18}$)sulfate, ($C_6$-$C_{18}$)ethersulfate, ($C_6$-$C_{18}$)sulfonate, ($C_6$-$C_{18}$)sulfosuccinate ($C_6$-$C_{18}$)phosphate, ($C_6$-$C_{18}$)carboxylate, and mixtures of two or more thereof, more preferably from the group consisting of salts of ($C_8$-$C_{16}$)sulfate, ($C_8$-$C_{16}$)ethersulfate, ($C_8$-$C_{16}$)sulfonate, ($C_8$-$C_{16}$)sulfosuccinate, ($C_8$-$C_{16}$)phosphate, ($C_8$-$C_{16}$)carboxylate, and mixtures of two or more thereof, more preferably from the group consisting of salts of ($C_{10}$-$C_{14}$)sulfate, ($C_{10}$-$C_{14}$)ethersulfate, ($C_{10}$-$C_{14}$)sulfonate, ($C_8$-$C_{14}$)sulfosuccinate, ($C_{10}$-$C_{14}$) phosphate, ($C_{10}$-$C_{14}$)carboxylate, and mixtures of two or more thereof, more preferably from the group consisting of salts of laurylsulfate, laurylsulfonate, dioctyl sulfosuccinate, laurylphosphate, laurate, and mixtures of two or more thereof, wherein the counterion is preferably selected from the group consisting of $H^+$, alkali metals, alkaline earth metals, ammonium, and combinations of two or more thereof, more preferably from the group consisting of $H^+$, $Li^+$, $Na^+$, $K^+$, ammonium, and combinations of two or more thereof, more preferably from the group consisting of $Na^+$, $K^+$, ammonium, and combinations of two or more thereof, wherein even more preferably the counterion is $Na^+$ and/or ammonium, preferably $Na^+$.

A further preferred embodiment (8) concretizing any one of embodiments (4) to (7) relates to said catalyst, wherein the one or more ionic surfactants comprise one or more zwitterionic surfactants, more preferably one or more betaines, wherein more preferably the one or more ionic surfactants comprise cocamidopropylbetaine or alkyldimethylaminoxide.

A further preferred embodiment (9) concretizing any one of embodiments (4) to (8) relates to said catalyst, wherein the one or more nonionic surfactants are selected from the group consisting of ($C_8$-$C_{22}$)alcohols, ($C_6$-$C_{20}$)alcohol ethoxylates with 1 to 8 ethylene oxide units, ($C_6$-$C_{20}$)alkyl polyglycosides, polyoxyethylene glycol alkyl ethers, polyoxypropylene glycol alkyl ethers, glucoside alkyl ethers, polyoxyethylene glycol alkylphenol ethers, glycerol alkyl esters, sorbitan alkyl esters, polyoxyethylene glycol sorbitan alkyl esters, cocamide monoethanolamine, cocamide diethanolamine, dodecyldimethylamine oxide, block copolymers of polyethylene glycol and polypropylene glycol, polyethoxylated tallow amine, and mixtures of two or more thereof, wherein more preferably the one or more nonionic surfactants are selected from the group consisting of ($C_{14}$-$C_{20}$)alcohols, ($C_8$-$C_{18}$)alcohol ethoxylates with 2 to 6 ethylene oxide units, ($C_8$-$C_{18}$)alkyl polyglycosides, octaethylene glycol monododecyl ether and/or pentaethylene glycol monododecyl ether, polyoxypropylene glycol alkyl ethers, decyl glucoside, lauryl glucoside, myristil glucoside, octyl glucoside, polyoxyethylene glycol octylphenol ethers, preferably triton X100, nonoxynol-9, glyceryl laurate, polyglycerol polyricinoleate, sorbitan monolaurate, sorbitan monopalmitate, sorbitan monostearate, sorbitan monooleate, polyoxyethylene sorbitan monolaurate, polyoxyethylene sorbitan monopalmitate, polyoxyethylene sorbitan monostearate, polyoxyethylene sorbitan monooleate, polyoxyethylene (10) oleyl ether, polyoxyethylene (20) oleyl ether, cocamide monoethanolamine, cocamide diethanolamine, dodecyldimethylamine oxide, block copolymers of polyethylene glycol and polypropylene glycol, polyethoxylated tallow amine, and mixtures of two or more thereof, wherein more preferably the one or more nonionic surfactants are selected from the group consisting of $(C_{16}-C_{18})$alcohols, $(C_{16}-C_{18})$alcohol ethoxylates with 2 to 6 ethylene oxide units, $(C_8-C_{14})$alkyl polyglycosides, preferably cetyl alcohol, stearyl alcohol, oleyl alcohol, and mixtures of two or more thereof, octaethylene glycol monododecyl ether and/or pentaethylene glycol monododecyl ether, polyoxypropylene glycol alkyl ethers, decyl glucoside, lauryl glucoside, myristil glucoside, octyl glucoside, polyoxyethylene glycol octylphenol ethers, nonoxynol-9, glyceryl laurate, polyglycerol polyricinoleate, sorbitan monolaurate, sorbitan monopalmitate, sorbitan monostearate, sorbitan oleate, polyoxyethylene (20) sorbitan monolaurate, polyoxyethylene (20) sorbitan monopalmitate, polyoxyethylene (20) sorbitan monostearate, polyoxyethylene (20) sorbitan monooleate, polyoxyethylene (10) oleyl ether, polyoxyethylene (20) oleyl ether, cocamide monoethanolamine, cocamide diethanolamine, dodecyldimethylamine oxide, block copolymers of polyethylene glycol and polypropylene glycol, polyethoxylated tallow amine, Stearyl-$EO_2$, polyglyceryl-2-dipolyhydroxystearate, polyglyceryl-distearate, C13/15-$PEG_3$, C13-$PEG_2$, glyceryl monooleate, C16/18-$PEG_2$, oleyl-$PEG_2$, $PEG_{20}$-sorbitan monooleate, functionalized polyisobutene, C16/18-$PEG_9$, and mixtures of two or more thereof, more preferably from the group consisting of polyglyceryl-2-dipolyhydroxystearate, diglyceryldistearate, triglyceryl-distearate, C13/15-$PEG_3$, C13-$PEG_2$, glyceryl monooleate, sorbitan monooleate, polyglycerol-3-polyricinoleate, C16/18-$PEG_2$, oleyl-$PEG_2$, $PEG_{20}$-sorbitan monooleate, functionalized polyisobutene, C16/18-$PEG_9$, polyoxyethylene (10) oleyl ether, polyoxyethylene (20) oleyl ether, and mixtures of two or more thereof, more preferably from the group consisting of polyglyceryl-2-dipolyhydroxystearate, diglyceryldistearate, triglyceryl-distearate, polyoxyethylene (10) oleyl ether, polyoxyethylene (20) oleyl ether, and mixtures of two or more thereof, wherein it is even more preferred that the one or more nonionic surfactants comprise polyoxyethylene (10) oleyl ether and/or polyoxyethylene (20) oleyl ether.

A further preferred embodiment (10) concretizing any one of embodiments (1) to (9) relates to said catalyst, wherein the stabilizing ligands form a micelle and or a liposome around at least a portion of the respective nanoparticles, more preferably a liposome.

A further preferred embodiment (11) concretizing any one of embodiments (1) to (10) relates to said catalyst, wherein the catalyst comprises from 0.01 to 10 wt.-% of transition metal nanoparticles calculated as the transition metal and based on 100 wt.-% of the support material, more preferably from 0.05 to 6 wt.-%, more preferably from 0.1 to 4 wt.-%, more preferably from 0.3 to 3 wt.-%, more preferably from 0.5 to 2.5 wt.-%, more preferably from 0.6 to 2 wt.-%, more preferably from 0.7 to 1.5 wt.-%, more preferably from 0.8 to 1.3 wt.-%, and more preferably from 0.9 to 1.1 wt.-%.

A further preferred embodiment (12) concretizing any one of embodiments (1) to (11) relates to said catalyst, wherein the support material comprises carbon and/or a metal oxide and/or a metalloid oxide, more preferably activated carbon and/or an oxide selected from the group consisting of oxides of Si, Al, Ti, Zr, Hf, La, Ce, Pr, Nd, and mixtures and/or mixed oxides of two or more thereof, more preferably from the group consisting of oxides of Si, Al, Ti, Zr, and mixtures and/or mixed oxides of two or more thereof, wherein more preferably the support material is selected from the group consisting of activated carbon, silica, alumina, silica-alumina, aluminosilicates, titanosilicates, and mixtures of two or more thereof, wherein more preferably the support material comprises activated carbon and/or aluminosilicate, preferably sodium aluminosilicate, wherein more preferably the support material consists of activated carbon and/or aluminosilicate, preferably of sodium aluminosilicate.

A further preferred embodiment (13) concretizing any one of embodiments (1) to (12) relates to said catalyst, wherein the support material is a particulate material, wherein more preferably the particulate material displays and weight-based average particle size D50 in the range of from 10 to 800 µm, preferably of from 20 to 500 µm, more preferably of from 40 to 350 µm, more preferably of from 60 to 250 µm, more preferably of from 80 to 200 µm, more preferably of from 100 to 180 µm, more preferably of from 120 to 160 µm, and more preferably of from 130 to 150 µm, wherein preferably the particle size distribution is determined according to ISO 13320-1, and the weight-based average particle size D50 is preferably calculated according to ISO 9276-2:2001.

A further preferred embodiment (14) concretizing any one of embodiments (1) to (12) relates to said catalyst, wherein the support material is a monolith substrate and/or is in the form of granules.

A further preferred embodiment (15) concretizing any one of embodiments (1) to (14) relates to said catalyst, wherein the support material has a BET surface area in the range of from 50 to 800 m$^2$/g, more preferably of from 80 to 600 m$^2$/g, more preferably of from 100 to 500 m$^2$/g, more preferably of from 120 to 450 m$^2$/g, more preferably of from 140 to 300 m$^2$/g, more preferably of from 160 to 250 m$^2$/g, and more preferably of from 180 to 220 m$^2$/g, wherein preferably the surface area is determined according to ISO 9277:2010.

An embodiment (16) of the present invention relates to a process for the preparation of a catalyst, preferably of a catalyst according to any one of embodiments (1) to (15), said process comprising (1) dissolving one or more surfactants and optionally one or more coordinating agents into a solvent system;

(2) dissolving one or more transition metal salts into a solvent system;

(3) mixing the solution obtained in (1) with the solution obtained in (2);

(4) optionally adjusting the pH of the mixture obtained in (3) to a pH in the range of from 2 to 8;

(5) heating the mixture obtained in (3) or (4) to a temperature in the range of from 50 to 100° C. for forming stabilized transition metal nanoparticles;

(6) separating excess surfactant from the mixture obtained in (5);

(7) contacting the mixture obtained in (6) with a support material for supporting the stabilized transition metal nanoparticles on the support material; wherein in the mixture obtained in (6), the molar ratio of the one or more surfactants to the transition metal in the nanoparticles calculated as the element is preferably comprised in the range of from 1 to 7.

A preferred embodiment (17) concretizing embodiment (16) relates to said process wherein in (6) the molar amount of surfactants in the mixture obtained in (5) is reduced by 20 to 80%, more preferably by 25 to 75%, more preferably by 30 to 70%, more preferably by 35 to 65%, more preferably by 40 to 60%, and more preferably by 45 to 55%.

A further preferred embodiment (18) concretizing embodiment (16) or (17) relates to said process, wherein contacting in (7) is achieved by impregnation, more preferably by incipient wetness impregnation and/or by vacuum impregnation, preferably by vacuum impregnation.

A further preferred embodiment (19) concretizing any one of embodiments (16) to (18) relates to said process, wherein in the mixture obtained in (3), the molar ratio of the one or more surfactants to the transition metal calculated as the element is comprised in the range of from 0.1 to 50, more preferably from 0.3 to 30, more preferably from 0.5 to 20, more preferably from 1 to 15, more preferably from 3 to 12, more preferably from 5 to 10, more preferably from 7 to 8.5, and more preferably from 7.5 to 8.

A further preferred embodiment (20) concretizing any one of embodiments (16) to (19) relates to said process, wherein in the mixture obtained in (6), the molar ratio of the one or more surfactants to the transition metal in the nanoparticles calculated as the element is comprised in the range of from 2 to 6, more preferably of from 2.5 to 5, more preferably of from 3 to 4.5, more preferably of from 3.3 to 4, and more preferably of from 3.5 to 3.7.

A further preferred embodiment (21) concretizing any one of embodiments (16) to (20) relates to said process wherein separation of the excess surfactant in (6) is achieved by centrifugation and/or filtration, more preferably by filtration, more preferably by membrane filtration, more preferably by nanofiltration, and more preferably by dialysis.

A further preferred embodiment (22) concretizing any one of embodiments (16) to (21) relates to said process, wherein in (5) the mixture is heated for a duration in the range of from 0.05 to 24 h, more preferably from 0.1 to 12 h, more preferably from 0.25 to 6 h, more preferably from 0.5 to 4 h, more preferably from 1 to 3 h, and more preferably from 1.5 to 2.5 h.

A further preferred embodiment (23) concretizing any one of embodiments (16) to (22) relates to said process, wherein in (5) the mixture is heated to a temperature in the range of from 70 to 95° C., more preferably of from 75 to 90° C., and more preferably of from 80 to 85° C.

A further preferred embodiment (24) concretizing any one of embodiments (16) to (23) relates to said process, wherein in (4) the pH is adjusted to a pH in the range of from 2.5 to 7.5, more preferably of from 3 to 7, more preferably of from 3.5 to 6.5, more preferably of from 4 to 6, and more preferably of from 4.5 to 5.5.

A further preferred embodiment (25) concretizing any one of embodiments (16) to (24) relates to said process, wherein the transition metal of the one or more transition metal salts in (2) is selected from the group consisting of Cu, Ru, Rh, Pd, Ag, Re, Os, Ir, Pt, Au, and mixtures of two or more thereof, more preferably from the group consisting of Pd, Pt, Ru, Rh, Au, Ag, and mixtures of two or more thereof, more preferably from the group consisting of Pd, Pt, Au, Ag, and mixtures of two or more thereof, wherein more preferably the transition metal of the one or more transition metal salts in (2) comprises Pd or Pd and Au, wherein more preferably the transition metal of the one or more transition metal salts in (2) is Pd or Pd and Au, preferably Pd.

A further preferred embodiment (26) concretizing any one of embodiments (16) to (25) relates to said process, wherein the counterion of the one or more transition metal salts in (2) is selected from the group consisting of halides, hydroxide, nitrate, phosphate, sulfate, and combinations of two or more thereof, more preferably from the group consisting of chloride, bromide, hydroxide, nitrate, sulfate, and combinations of two or more thereof, wherein more preferably the counterion is chloride and/or nitrate, preferably chloride.

A further preferred embodiment (27) concretizing embodiment (26) relates to said process, wherein the one or more transition metal salts in (2) are provided as a halide complex, more preferably as a chloride complex, and more preferably as a tetrachloro complex, wherein the counterion of the complex is preferably selected from the group consisting of $H^+$, alkali metals, alkaline earth metals, ammonium, and combinations of two or more thereof, more preferably from the group consisting of $Na^+$, $K^+$, $H^+$, and combinations of two or more thereof, wherein more preferably the counterion is $Na^+$ and/or $H^+$, preferably $Na^+$.

A further preferred embodiment (28) concretizing any one of embodiments (16) to (27) relates to said process, wherein independently from one another, the solvent system in (1) and (2) comprises one or more polar solvents, more preferably one or more polar protic solvents, more preferably one or more polar protic solvents selected from the group consisting of C1-C4 alcohols, water, and mixtures of two or more thereof, more preferably from the group consisting of n-propanol, isopropanol, methanol, ethanol, water, and mixtures of two or more thereof, more preferably from the group consisting of methanol, ethanol, water, and mixtures of two or more thereof, wherein more preferably the solvent system comprises ethanol and/or water, preferably water, wherein more preferably the solvent system is ethanol and/or water, preferably water.

A further preferred embodiment (29) concretizing any one of embodiments (16) to (28) relates to said process, wherein the one or more surfactants in (1) are selected from the group consisting of ionic and nonionic surfactants, including mixtures thereof, more preferably from the group consisting of ionic surfactants.

A further preferred embodiment (30) concretizing embodiment (29) relates to said process, wherein the one or more ionic surfactants comprise one or more cationic surfactants, more preferably one or more cationic surfactants selected from the group consisting of tetraalkylammonium compounds, including mixtures of two or more thereof, wherein more preferably the cationic surfactants comprise one or more hydroxyl group containing tetraalkylammonium compounds, preferably one or more tetraalkylammonium compounds containing $R^1R^2R^3N^+R^4OH$, wherein $R^1$ stands for C10-C20 alkyl, preferably for C12-C19 alkyl, more preferably for C14-C18 alkyl, more preferably for C15-C17 alkyl, and more preferably for C16 alkyl, wherein independently from one another, $R^2$ and $R^3$ stands for C1-C5 alkyl, preferably for C1-C4 alkyl, more preferably for C1-C3 alkyl, more preferably for C1-C2 alkyl, and more preferably for C1 alkyl, and $R^4$ stands for C1-C6 alkylene, preferably for C1-C5 alkylene, more preferably for C2-C4 alkylene, more preferably for C2-C3 alkylene, and more preferably for C2 alkylene, wherein more preferably the one or more cationic surfactants comprise a hexadecyl(2-hydroxyethyl)dimethyl ammonium containing compound, wherein the counterion is preferably selected from the group consisting of halides, carbonates, hydroxide, nitrate, phosphate, hydrogen phosphate, dihydrogen phosphate, sulfate, hydrogen sulfate, and combinations of two or more thereof, more preferably from the group consisting of chloride, fluoride, bromide, hydrogen carbonate, hydroxide, nitrate, hydrogen phosphate, dihydrogen phosphate, hydrogen sulfate, and combinations of two or more thereof, more preferably from the group consisting of hydroxide, nitrate, dihydrogen phosphate, hydrogen sulfate, and combinations of two or more thereof, wherein more preferably the counterion is dihydrogen phosphate, wherein more preferably the one or more ionic surfactants comprise hexadecyl(2-hydroxyethyl)dimethyl ammonium dihydrogen phosphate, wherein more preferably the ionic surfactant is hexadecyl(2-hydroxyethyl)dimethyl ammonium dihydrogen phosphate.

A further preferred embodiment (31) concretizing embodiment (29) or (30) relates to said process, wherein the one or more ionic surfactants comprise one or more cationic surfactants, more preferably one or more cationic surfactants selected from the group consisting of primary, secondary, tertiary, and quaternary ammonium compounds, including mixtures of two or more thereof, wherein more preferably the cationic surfactants comprise one or more quaternary ammonium compounds, preferably selected from the group consisting of salts of $(C_8-C_{18})$trimethylammonium, $(C_8-C_{18})$ pyridinium, benzalkonium, benzethonium, dimethyldiocta-decylammonium, cetrimonium, dioctadecyldimethylammonium, and mixtures of two or more thereof, more preferably from the group consisting of salts of cetyltrimethylammonium, dodecyltrimethylammonium, cetylpyridinium, benzalkonium, benzethonium, dimethyldioctadecylammonium, cetrimonium, dioctadecyldimethylammonium, wherein the counterion is preferably selected from the group consisting of halides, carbonates, hydroxide, nitrate, phosphate, sulfate, and combinations of two or more thereof, more preferably from the group consisting of chloride, fluoride, bromide, hydrogen carbonate, hydroxide, nitrate, sulfate, and combinations of two or more thereof, wherein more preferably the counterion is chloride and/or nitrate, preferably chloride.

A further preferred embodiment (32) concretizing any one of embodiments (29) to (31) relates to said process, wherein the one or more ionic surfactants comprise one or more anionic surfactants, more preferably one or more anionic surfactants selected from the group consisting of salts of $(C_6-C_{18})$sulfate, $(C_6-C_{18})$ethersulfate, $(C_6-C_{18})$sulfonate, $(C_6-C_{18})$sulfosuccinate $(C_6-C_{18})$phosphate, $(C_6-C_{18})$carboxylate, and mixtures of two or more thereof, more preferably from the group consisting of salts of $(C_8-C_{16})$sulfate, $(C_8-C_{16})$ethersulfate, $(C_8-C_{16})$sulfonate, $(C_8-C_{16})$sulfosuccinate, $(C_8-C_{16})$phosphate, $(C_8-C_{16})$carboxylate, and mixtures of two or more thereof, more preferably from the group consisting of salts of $(C_{10}-C_{14})$sulfate, $(C_{10}-C_{14})$ethersulfate, $(C_{10}-C_{14})$sulfonate, $(C_8-C_{14})$sulfosuccinate, $(C_{10}-C_{14})$ phosphate, $(C_{10}-C_{14})$carboxylate, and mixtures of two or more thereof, more preferably from the group consisting of salts of laurylsulfate, laurylsulfonate, dioctyl sulfosuccinate, laurylphosphate, laurate, and mixtures of two or more thereof, wherein the counterion is preferably selected from the group consisting of H$^+$, alkali metals, alkaline earth metals, ammonium, and combinations of two or more thereof, more preferably from the group consisting of H$^+$, Li$^+$, Na$^+$, K$^+$, ammonium, and combinations of two or more thereof, more preferably from the group consisting of Na$^+$, K$^+$, ammonium, and combinations of two or more thereof, wherein even more preferably the counterion is Nat and/or ammonium, preferably Na$^+$.

A further preferred embodiment (33) concretizing any one of embodiments (29) to (32) relates to said process, wherein the one or more ionic surfactants comprise one or more zwitterionic surfactants, more preferably one or more betaines, wherein more preferably the one or more ionic surfactants comprise cocamidopropylbetaine or alkyldimethylaminoxide.

A further preferred embodiment (34) concretizing any one of embodiments (29) to (33) relates to said process, wherein the one or more nonionic surfactants are selected from the group consisting of $(C_8-C_{22})$alcohols, $(C_6-C_{20})$alcohol ethoxylates with 1 to 8 ethylene oxide units, $(C_6-C_{20})$alkyl polyglycosides, polyoxyethylene glycol alkyl ethers, polyoxypropylene glycol alkyl ethers, glucoside alkyl ethers, polyoxyethylene glycol alkylphenol ethers, glycerol alkyl esters, sorbitan alkyl esters, polyoxyethylene glycol sorbitan alkyl esters, cocamide monoethanolamine, cocamide diethanolamine, dodecyldimethylamine oxide, block copolymers of polyethylene glycol and polypropylene glycol, polyethoxylated tallow amine, and mixtures of two or more thereof, wherein more preferably the one or more nonionic surfactants are selected from the group consisting of $(C_{14}-C_{20})$alcohols, $(C_8-C_{18})$alcohol ethoxylates with 2 to 6 ethylene oxide units, $(C_8-C_{18})$alkyl polyglycosides, octaethylene glycol monododecyl ether and/or pentaethylene glycol monododecyl ether, polyoxypropylene glycol alkyl ethers, decyl glucoside, lauryl glucoside, myristil glucoside, octyl glucoside, polyoxyethylene glycol octylphenol ethers, preferably triton X100, nonoxynol-9, glyceryl laurate, polyglycerol polyricinoleate, sorbitan monolaurate, sorbitan monopalmitate, sorbitan monostearate, sorbitan monooleate, polyoxyethylene sorbitan monolaurate, polyoxyethylene sorbitan monopalmitate, polyoxyethylene sorbitan monostearate, polyoxyethylene sorbitan monooleate, polyoxyethylene (10) oleyl ether, polyoxyethylene (20) oleyl ether, cocamide monoethanolamine, cocamide diethanolamine, dodecyldimethylamine oxide, block copolymers of polyethylene glycol and polypropylene glycol, polyethoxylated tallow amine, and mixtures of two or more thereof, wherein more preferably the one or more nonionic surfactants are selected from the group consisting of $(C_{16}-C_{18})$alcohols, $(C_{16}-C_{18})$alcohol ethoxylates with 2 to 6 ethylene oxide units, $(C_8-C_{14})$alkyl polyglycosides, preferably cetyl alcohol, stearyl alcohol, oleyl alcohol, and mixtures of two or more thereof, octaethylene glycol monododecyl ether and/or pentaethylene glycol monododecyl ether, polyoxypropylene glycol alkyl ethers, decyl glucoside, lauryl glucoside, myristil glucoside, octyl glucoside, polyoxyethylene glycol octylphenol ethers, nonoxynol-9, glyceryl laurate, polyglycerol polyricinoleate, sorbitan monolaurate, sorbitan monopalmitate, sorbitan monostearate, sorbitan oleate, polyoxyethylene (20) sorbitan monolaurate, polyoxyethylene (20) sorbitan monopalmitate, polyoxyethylene (20) sorbitan monostearate, polyoxyethylene (20) sorbitan monooleate, polyoxyethylene (10) oleyl ether, polyoxyethylene (20) oleyl ether, cocamide monoethanolamine, cocamide diethanolamine, dodecyldimethylamine oxide, block copolymers of polyethylene glycol and polypropylene glycol, polyethoxylated tallow amine, Stearyl-EO$_2$, polyglyceryl-2-dipolyhydroxystearate, polyglyceryl-distearate, C13/15-PEG$_3$, C13-PEG$_2$, glyceryl monooleate, C16/18-PEG$_2$, oleyl-PEG$_2$, PEG$_{20}$-sorbitan monooleate, functionalized polyisobutene, C16/18-PEG$_9$, and mixtures of two or more thereof, more preferably from the group consisting of polyglyc-eryl-2-dipolyhydroxystearate, diglyceryldistearate, tri-glyceryl-distearate, C13/15-$PEG_3$, C13-$PEG_2$, glyceryl monooleate, sorbitan monooleate, polyglycerol-3-polyricinoleate, C16/18-$PEG_2$, oleyl-$PEG_2$, $PEG_{20}$-sorbitan monooleate, functionalized polyisobutene, C16/18-$PEG_9$, polyoxyethylene (10) oleyl ether, poly-oxyethylene (20) oleyl ether, and mixtures of two or more thereof, more preferably from the group consisting of polyglyc-eryl-2-dipolyhydroxystearate, diglyceryldistearate, tri-glyceryl-distearate, polyoxyethylene (10) oleyl ether, polyoxyethylene (20) oleyl ether, and mixtures of two or more thereof, wherein it is even more preferred that the one or more nonionic surfactants comprise polyoxyethylene (10) oleyl ether and/or polyoxyethylene (20) oleyl ether.

A further preferred embodiment (35) concretizing any one of embodiments (16) to (34) relates to said process, wherein the one or more optional coordinating agents in (1) comprise urea and/or ammonia, preferably urea, wherein more pref-erably the one or more optional coordinating agents consist of urea and/or ammonia, preferably of urea.

A further preferred embodiment (36) concretizing any one of embodiments (16) to (35) relates to said process, wherein in the mixture obtained in (3), the molar ratio of the one or more coordinating agents to the transition metal in the nanoparticles calculated as the element is comprised in the range of from 0.01 to 2, more preferably of from 0.05 to 1, more preferably of from 0.1 to 0.7, more preferably of from 0.15 to 0.5, more preferably of from 0.2 to 0.45, more preferably of from 0.25 to 0.4, and more preferably of from 0.3 to 0.35.

A further preferred embodiment (37) concretizing any one of embodiments (16) to (36) relates to said process, wherein the support material in (7) comprises carbon and/or a metal oxide and/or a metalloid oxide, more preferably activated carbon and/or an oxide selected from the group consisting of oxides of Si, Al, Ti, Zr, Hf, La, Ce, Pr, Nd, and mixtures and/or mixed oxides of two or more thereof, more preferably from the group consisting of oxides of Si, Al, Ti, Zr, and mixtures and/or mixed oxides of two or more thereof, wherein more preferably the support material is selected from the group consisting of activated carbon, silica, alu-mina, silica-alumina, aluminosilicates, titanosilicates, and mixtures of two or more thereof, wherein more preferably the support material comprises activated carbon and/or silicalite, preferably silicalite, wherein more preferably the support material consists of activated carbon and/or sili-calite, preferably of silicalite.

A further preferred embodiment (38) concretizing any one of embodiments (16) to (37) relates to said process, wherein the support material in (7) is a particulate material, wherein prior to contacting in (7), the particulate material more preferably displays an weight-based average particle size D50 in the range of from 10 to 800 μm, more preferably of from 20 to 500 μm, more preferably of from 40 to 350 μm, more preferably of from 60 to 250 μm, more preferably of from 80 to 200 μm, more preferably of from 100 to 180 μm, more preferably of from 120 to 160 μm, and more preferably of from 130 to 150 μm, wherein preferably the average particle size distribution is determined according to ISO 13320-1, and the weight-based average particle size D50 is calculated according to ISO 9276-2:2001.

A further preferred embodiment (39) concretizing any one of embodiments (16) to (38) relates to said process, wherein the support material in (7) is a monolith substrate and/or is in the form of granules.

A further preferred embodiment (40) concretizing any one of embodiments (16) to (39) relates to said process, wherein prior to contacting in (7), the support material has a BET surface area in the range of from 50 to 800 $m^2/g$, more preferably of from 80 to 600 $m^2/g$, more preferably of from 100 to 500 $m^2/g$, more preferably of from 120 to 450 $m^2/g$, more preferably of from 140 to 300 $m^2/g$, more preferably of from 160 to 250 $m^2/g$, and more preferably of from 180 to 220 $m^2/g$, wherein preferably the surface area is deter-mined according to ISO 9277:2010.

An embodiment (41) of the present invention relates to a catalyst comprising transition metal nanoparticles, stabiliz-ing ligands, and a support material, wherein the stabilizing ligands are adsorbed on the surface of the transition metal nanoparticles such as to form stabilized transition metal nanoparticles, wherein the stabilized transition metal nan-oparticles are supported on the support material, wherein the catalyst is obtainable and/or obtained by the process accord-ing to any of embodiments (16) to (40).

An embodiment (42) of the present invention relates to a use of a catalyst according to any of embodiments (1) to (15) and (41) as a hydrogenation catalyst, preferably as a hydro-genation catalyst in the production of hydrogen peroxide, and more preferably as a hydrogenation catalyst in the anthraquinone process for the production of hydrogen per-oxide.

EXPERIMENTAL SECTION

The present invention is further illustrated by the follow-ing examples and reference examples.

Reference Example 1: Determination of the
Average Size D50 (by Number) of the Transition
Metal Nanoparticles The average size D50 by number of the transition metal nanoparticles was measured by transmission electron microscopy (TEM). Samples were prepared by first dispers-ing the transition metal nanoparticles in ethanol, wherein the samples were eventually crushed beforehand in a mortar, and applying the resulting dispersions between objective slides which produced a thin film. An ultra-thin carbon TEM carrier was then contacted with each of the thin films. The prepared samples of the transition metal nanoparticles were investigated using a Tecnai G2-F20ST machine (FEI Com-pany, Hillsboro, USA) operated at 200 keV. Images and spectroscopy data were evaluated using the OlympusiTEM 5.2 (Build 3554) (Olympus, Tokyo, Japan) and FEI TIA 4.1.202 (FEI Company, Hillsboro, USA) software packages. For transition metal nanoparticle size determination, the microscope's magnification was calibrated using a MAG*I*CAL calibration sample (Technoorg Linda Ltd., Budapest, Hungary). The average transition metal nanopar-ticle size was determined by manually measuring the small-est diameter of about 200 transition metal nanoparticles per sample using the Olympus iTEM 5.2 software.

Reference Example 2: Determination of the BET
Surface Area

The BET surface area of samples was measured on an ASAP 2420 from Micromeritics and was calculated as multipoint over P/Po: 0.05, 0.06, 0.07, 0.08, 0.09, 0.10.

Reference Example 3: Determination of Carbon Content

The carbon content of samples was measured on a Vario El Cube from Elementar. A sample is burned at 1150° C. ("flash combustion"). The generated NOx, CO2 and SO3 is transferred in He carrier gas over a Cu-reduction column, and then onto an adsorption column. N2, CO2 and SO2 are desorbed separately by heating the adsorption column and detected based on their conductivity.

Example 1: Preparation of a Supported Pd Catalyst Using Nanofiltration and Vacuum Impregnation Colloid Preparation A Pd colloid was prepared based on the procedure described in WO 2016/151453 A1, but at a larger scale using 2 L water instead of 0.6 L. To this effect, a 4 L beaker was equipped with baffles and filled with 2 L water at room temperature (i.e. 20-25° C.). Using a top stirrer, the water was stirred at 300 rpm. The reducing/stabilizing agent (100 mL 30 wt. % Luviquat® Mono CP (hydroxyethyl cetyldimonium phosphate, i.e. hexadecyl(2-hydroxyethyl)dimethylammonium dihydrogen phosphate) in water, obtained from Sigma-Aldrich) and the coordinating agent urea (1.0 g) were added in one portion and the mixture was stirred for several minutes. A Pd solution (5.68 g 17.55 wt. % Pd as $Na_2PdCl_4$ diluted 100 ml water) was added to the mixture over a period of 30 min. After the addition of the Pd solution the pH of the mixture was set to 5.0 by the addition of NaOH max 4%; Particle size <80 μm: max 4%; pore volume (by $N_2$): 0.69 mL/g; pore volume (by Hg-porosimetry): 0.73 mL/g; specific surface area (by $N_2$): 200 m²/g; XRD: mostly amorphous) was dried on the rotavapor (2 hours, 50 degrees, 100 mbar). The material is cooled to room temperature. The concentrated Pd colloid is sprayed under reduced pressure (500 mbar) onto the support. After impregnation the water is removed under vacuum at 75 degrees.

Catalyst Analysis

For this sample we analyzed the Pd and C content: 0.93 wt. % Pd and 7.5 wt.-% C, corresponding to 8.74 mmol Pd and 624 mmol C per 100 g of the sample. In view of the fact that the hexadecyl(2-hydroxyethyl)dimethylammonium dihydrogen phosphate stabilizing ligand contains 20 C-atoms, the amount of ligand per 100 g of sample may be calculated to 624 mmol: 20=31.2 mmol per 100 g of the sample. Thus, based on the elemental analysis, the molar ratio of the stabilizing ligand to Pd in the sample may be calculated as being 31.2 mmol: 8.74 mmol=3.57.

Example 2: Catalyst Testing in the Production of Hydrogen Peroxide According to the Anthraquinone Process The performance of the supported Pd catalyst obtained according to example 1 was evaluated in the anthroquinone process. The results from catalyst testing in the anthraquinone process are described in the following table, wherein the k1 was determined at the beginning of the reaction (between 1 and 4 minutes) and k2 was obtained at the end of the reaction (between 55 and 60 minutes), respectively:

| Catalyst | Catalyst [g] | Pd [wt.- %] | Pd [mg] | Stabilizer [wt.- %] | k1 [×10⁻⁴] | k2 [×10⁻⁶] | k1/k2 [×10²] |
|---|---|---|---|---|---|---|---|
| Ex. 1 | 2 | 0.93 | 19 | 50 | 3.1 | 0 | ∞ | solution (10 wt. % NaOH in water). The mixture was heated to 95° C. and kept at this temperature for two hours, while keeping the water level constant. After letting the mixture cool to room temperature, the number-based average particle size D50 of the Pd nanoparticles obtained was determined to be around 2 nm. The molar ratio of the stabilizing ligand to Pd was calculated as being 7.8.

Colloid Dialysis

The Pd colloid is divided into 4 equal portions of ~500 mL. Every portion is put into a cellulose dialysis tube (obtained from Sigma Aldrich, molecular weight cut off 14,000), that was previously soaked in water and washed. The tubes were closed with a plastic clamp and all 4 tubes were added into a tank containing 25 L water. The water in the tank was very slowly mixed (2 magnetic stirrers of 5 cm at 100 rpm). The water in the tank was refreshed after 3 days and once again after 2 days. At that time 2 tubes were removed, and the other 2 tubes were further dialyzed for 2 days. The content of one of the dialysis tubes that had the longest treatment was emptied into a 2 L round bottom flask and the water was removed under vacuum at 75 degrees at a rotavapor. The resulting solid material was dissolved in 20 mL water. Due to the removal of 50% of the stabilizing ligand, the molar ratio of the remaining stabilizing ligand to Pd was calculated as being 3.9.

Colloid Impregnation 21.5 g sodium aluminosilicate (Al2O3: 15-20 wt.-%; SiO2: 52-62 wt.-%; soluble salts: max 10 wt.-%; Bulk density (SPCA method): 0.40-0.55; particle size >200 μm:

In the table, the amount of stabilizer is based on 100 wt.-% of the stabilizer prior to the nanofiltration step employed in example 1. k1 describes the activity of the catalyst in the hydrogenation of anthraquinone and k2 describes the overhydrogenation reaction, i.e. the irreversible hydrogenation of the hydro-form of anthroquinone to a catalytically inactive species.

Accordingly, as may be taken from the results, the supported Pd catalyst of the present invention displays an excellent activity in the production of hydrogen peroxide according to the anthraquinone process using a comparatively low Pd loading. In particular, it has quite surprisingly been found that the inventive catalyst displays a selectivity of substantially 100% towards hydrogen peroxide, wherein the inventive catalyst substantially does not hydrogenate the hydroform of the anthroquinone co-catalyst to a catalytically inactive species, as a result of which the efficiency of the catalyst and the time on stream may be considerably improved.

CITED LITERATURE

WO 2009/096783 A1
Witte et al., "*Highly active and selective precious metal catalysts by use of the reduction-deposition method*", 10th International Symposium "Scientific Bases for the Preparation of Heterogeneous Catalysts", E. M. Gaigneaux, M. Devillers, S. Hermans, P. Jacobs, J. Martens, and P. Ruiz (Eds.), Elsevier 2010

Albani et al. in *Catal. Sci. Technol.* 2016, 6, 1621-1631
WO 2013/160163 A1
WO 2016/151453 A1
WO 2016/151454 A1
US 2008/193368 A1
US 2012/020872 A1
EP 2719455 A1

The invention claimed is:

1. A hydrogenation catalyst for an anthraquinone process for production of hydrogen peroxide, the catalyst comprising:

transition metal nanoparticles wherein the transition metal of the nanoparticles is selected from the group consisting of Cu, Ru, Rh, Pd, Ag, Re, Os, Ir, Pt, Au, and alloys of two or more thereof, stabilizing ligands comprising a cationic surfactant, and a support material selected from the group consisting of alumina, silica-alumina, aluminosilicates, and mixtures of two or more thereof, wherein at least a portion of the stabilizing ligands are adsorbed on the surface of the transition metal nanoparticles so as to form stabilized transition metal nanoparticles, wherein the stabilized transition metal nanoparticles are impregnated into the support material, wherein the catalyst displays a molar ratio of the stabilizing ligands to the transition metal in the nanoparticles calculated as the element, wherein the molar ratio is comprised in the range of from 3 to 4.5.

2. The catalyst according to claim 1, wherein the number-based average particle size D50 of the transition metal nanoparticles is in the range of from 0.2 to 20 nm.

3. The catalyst according to claim 1, wherein the stabilizing ligands form a micelle and/or a liposome around at least a portion of the respective nanoparticles.

4. The catalyst according to claim 1, wherein the catalyst comprises from 0.5 to 2.5 wt.-% of transition metal nanoparticles calculated as the transition metal and based on 100 wt.-% of the support material.

5. The catalyst according to claim 4, wherein the support material is a particulate material comprising sodium aluminosilicate.

6. The catalyst according to claim 5, wherein the support material has a BET surface area in the range of from 140 to 300 m²/g, wherein the BET surface area is determined according to ISO 9277:2010.

7. The catalyst according to claim 1, wherein the support material is a monolith substrate and/or is in the form of granules.

8. A process for the preparation of the catalyst of claim 1 comprising transition metal nanoparticles, stabilizing ligands, and a support material, the process comprising:

(1) dissolving one or more surfactants and optionally one or more coordinating agents into a solvent system;

(2) dissolving one or more transition metal salts into a solvent system;

(3) mixing the solution obtained in (1) with the solution obtained in (2);

(4) optionally adjusting the pH of the mixture obtained in (3) to a pH in the range of from 2 to 8;

(5) heating the mixture obtained in (3) or (4) to a temperature in the range of from 50 to 100° C. to form stabilized transition metal nanoparticles;

(6) separating excess surfactant from the mixture obtained in (5);

(7) contacting the mixture obtained in (6) with a support material for supporting the stabilized transition metal nanoparticles on the support material; wherein in the mixture obtained in (6), the molar ratio of the one or more surfactants to the transition metal in the nanoparticles calculated as the element is comprised in the range of from 1 to 7.

9. The process according to claim 8, wherein in (6) the molar amount of surfactants in the mixture obtained in (5) is reduced by 20 to 80%.

10. The process according to claim 8, wherein in (4) the pH is adjusted to a pH in the range of from 2.5 to 7.5.

11. A catalyst comprising:

transition metal nanoparticles wherein the transition metal of the nanoparticles is selected from the group consisting of Pd, Ag, Pt, Au, and alloys of two or more thereof; stabilizing ligands comprising a cationic surfactant; and a support material comprising sodium aluminosilicate;

wherein at least a portion of the stabilizing ligands are adsorbed on the surface of the transition metal nanoparticles so as to form stabilized transition metal nanoparticles, wherein the stabilized transition metal nanoparticles are impregnated into the support material, wherein the catalyst displays a molar ratio of the stabilizing ligands to the transition metal in the nanoparticles calculated as the element, wherein the molar ratio is comprised in the range of from 0.1 to 25, wherein the catalyst comprises from 0.5 wt % to 2.5 wt % of transition metal nanoparticles calculated as the transition metal and based on 100 wt % of the support material, wherein the support material has a BET surface area in the range of from 140 m²/g to 300 m²/g, wherein the BET surface area is determined according to ISO 9277:2010, wherein the catalyst is a hydrogenation catalyst for an anthraquinone process for production of hydrogen peroxide.

12. The catalyst of claim 11, wherein the stabilized transition metal nanoparticles are impregnated into the support material by incipient wetness impregnation and/or by vacuum impregnation.

* * * * *